(12) United States Patent
Wakimoto (10) Patent No.: US 10,567,715 B2
(45) Date of Patent: Feb. 18, 2020

(54) IMAGE DISPLAY APPARATUS AND METHOD FOR CONTROLLING THE SAME

(71) Applicant: SEIKO EPSON CORPORATION, Tokyo (JP)

(72) Inventor: Shingo Wakimoto, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/924,758

(22) Filed: Mar. 19, 2018

(65) Prior Publication Data

US 2018/0278900 A1 Sep. 27, 2018

(30) Foreign Application Priority Data

Mar. 24, 2017 (JP) ................. 2017-058430
Jan. 11, 2018 (JP) ................. 2018-002336

(51) Int. Cl.
*H04N 9/31* (2006.01)
*G06F 3/042* (2006.01)
*G06F 3/041* (2006.01)

(52) U.S. Cl.
CPC .......... *H04N 9/3152* (2013.01); *G06F 3/042* (2013.01); *G06F 3/0416* (2013.01); *G06F 3/0418* (2013.01); *G06F 3/0428* (2013.01); *H04N 9/3185* (2013.01); *H04N 9/3194* (2013.01)

(58) Field of Classification Search
CPC ... H04N 9/3152; H04N 9/3185; G06F 3/0418

USPC ........ 348/580, 744, 745, 739; 362/341, 297; 356/614
See application file for complete search history.

(56) References Cited

U.S. PATENT DOCUMENTS 9,207,812 B2 * 12/2015 Rattray ............... H04N 9/3179
9,465,480 B2 10/2016 Ichieda
2015/0204659 A1 7/2015 Furukawa
2015/0205377 A1 7/2015 Koyama

FOREIGN PATENT DOCUMENTS

JP 2015-159529 A 9/2015

OTHER PUBLICATIONS

Aug. 16, 2018 Extended European Search Report issued in European Patent Application No. 18163315.7.

* cited by examiner

*Primary Examiner* — Jefferey F Harold
*Assistant Examiner* — Jean W Desir
(74) *Attorney, Agent, or Firm* — Oliff PLC; B. Graham Nelson (57) ABSTRACT

An image display apparatus includes a display section that displays an image on a display surface, an output section that outputs light, a changer that changes the angle of the light outputted from the output section with respect to the display surface, a position detector that detects a reflected position where the light outputted by the output section is reflected, and a change controller that controls the changer based on the result of the detection performed by the position detector.

7 Claims, 8 Drawing Sheets

IMAGE DISPLAY APPARATUS AND METHOD FOR CONTROLLING THE SAME

BACKGROUND

1. Technical Field

The present invention relates to an image display apparatus and a method for controlling the same.

2. Related Art

JP-A-2015-159529 describes what is called an interactive projector that outputs planar detection light along a projection surface and detects the detection light reflected off a pointing element, such as a pen and a finger, to identify the position of the pointing element.

The projector described in JP-A-2015-159529 projects an image that assists adjustment of the orientation of the detection light based on the detection light reflected off a jig placed by a user on the projection surface. The user adjusts the orientation of the detection light while looking at the image.

In the case of the projector described in JP-A-2015-159529, to adjust the orientation of the detection light, the user needs to place the jig on the projection surface, and the adjustment task is therefore cumbersome.

SUMMARY

An advantage of some aspects of the invention is to provide a technology that allows reduction in cumbersomeness of the detection light orientation adjustment task as compared with the case where the user places the jig on the projection surface.

An image display apparatus according to an aspect of the invention includes a display section that displays an image on a display surface, an output section that outputs light, a changer that changes an angle of the light outputted from the output section with respect to the display surface, a position detector that detects a reflected position where the light outputted by the output section is reflected, and a change controller that controls the changer based on a result of the detection performed by the position detector.

According to the aspect described above, the angle of the light outputted from the output section with respect to the display surface is changed based on the result of the detection of the reflected position, where the light outputted by the output section is reflected. Therefore, as compared with a case where a user places a jig on the display surface and adjusts the orientation of the light outputted by the output section, the cumbersomeness of the adjustment task can be reduced.

In the image display apparatus according to the aspect described above, it is desirable that the changer includes a drive section and an adjustment mechanism that changes the angle in accordance with a drive action of the drive section, and that the change controller controls the drive action of the drive section based on the result of the detection performed by the position detector. According to the aspect described above, the angle of the light outputted from the output section with respect to the display surface can be automatically adjusted by controlling the drive action of the drive section.

In the image display apparatus according to the aspect described above, it is desirable that in a case where the position detector does not detect, as the reflected position, a target position on a side opposite the output section with respect to the image on the display surface even after the change controller controls the drive action of the drive section, the change controller determines, based on a relationship between an amount of the drive action of the drive section and an amount of movement of the reflected position, a target drive amount that allows the reflected position to move to the target position, and the change controller drives the drive section by the target drive amount. According to the aspect described above, for example, even in a case where low-intensity reflected light does not allow the position detector to detect the target position as the reflected position even after the change controller controls the drive action of the drive section, the reflected position can be moved to the target position.

In the image display apparatus according to the aspect described above, it is desirable that in the case where the position detector does not detect the target position as the reflected position even after the change controller controls the drive action of the drive section, the change controller measures the relationship based on the result of the detection performed by the position detector when the drive section is driven and determines the target drive amount based on the measured relationship. According to the aspect described above, since the target drive amount is determined based on the actual relationship between the drive action of the drive section and the amount of movement of the reflected position, the target drive amount can be determined with high accuracy.

In the image display apparatus according to the aspect described above, it is desirable that in a case where the position detector detects the reflected position when the drive section is driven by the target drive amount, the change controller controls the drive action of the drive section until the position detector does not detect the reflected position.

There is a conceivable case where a protrusion, for example, a frame, is present in an area on the side opposite the output section with respect to the image on the display surface. In this case, under the circumstance where the reflected position has been moved to the target position, the position detector undesirably detects, as the reflected position, a position where the light is reflected off the protrusion, and the reflected position could be wrongly recognized as the reflected position where the light is reflected off a pointing element.

According to the aspect described above, in the case where the reflected position is detected when the drive section is driven by the target drive amount, the drive action of the drive section is controlled until no reflected position is detected, whereby the possibility of the wrong recognition of the reflected position where the light is reflected off the protrusion described above as the reflected position where the light is reflected off the pointing element can be lowered.

In the image display apparatus according to the aspect described above, it is desirable that in a case where the position detector does not detect, as the reflected position, a target position on a side opposite the output section with respect to the image on the display surface even after the change controller controls the changer, the change controller increases an amount of the light outputted from the output section to a value greater than an amount of the light in the case. According to the aspect described above, for example, in a case where low-intensity reflected light does not allow the position detector to detect the target position as the reflected position even after the change controller controls the changer, the amount of the light outputted from the output section can be increased to a value greater than the amount of the light in the case described above, whereby the reflected position can be more readily detected.

It is desirable that the image display apparatus according to the aspect described above further includes an imager that captures an image of the display surface to produce a captured image, that the position detector detects the reflected position based on the captured image, and that in a case where the position detector does not detect, as the reflected position, a target position on a side opposite the output section with respect to the image on the display surface even after the change controller controls the changer, the change controller increases sensitivity of the imager to a value higher than the sensitivity in the case. According to the aspect described above, for example, in a case where low-intensity reflected light does not allow the position detector to detect the target position as the reflected position even after the change controller controls the changer, the sensitivity of the imager can be increased to a value higher than the sensitivity in the case described above, whereby the reflected position can be more readily detected.

A method for controlling an image display apparatus according to another aspect of the invention is a method for controlling an image display apparatus including a display section that displays an image on a display surface, an output section that outputs light, and a changer that changes an angle of the light outputted from the output section with respect to the display surface, the method including detecting a reflected position where the light outputted by the output section is reflected and controlling the changer based on a result of the detection of the reflected position. According to the aspect described above, as compared with the case where the user places a jig on the display surface and adjusts the orientation of the light outputted by the output section, the cumbersomeness of the adjustment task can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention will be described below with reference to the drawings. In the drawings, the dimension and scale of each portion differ from actual values as appropriate. Further, since the embodiment described below is a preferable specific example of the invention, a variety of technically preferable restrictions are imposed on the embodiment. The scope of the invention is, however, not limited to the restricted forms unless otherwise particularly stated in the following description that a restriction is imposed on the invention.

First Embodiment

Figure 1:
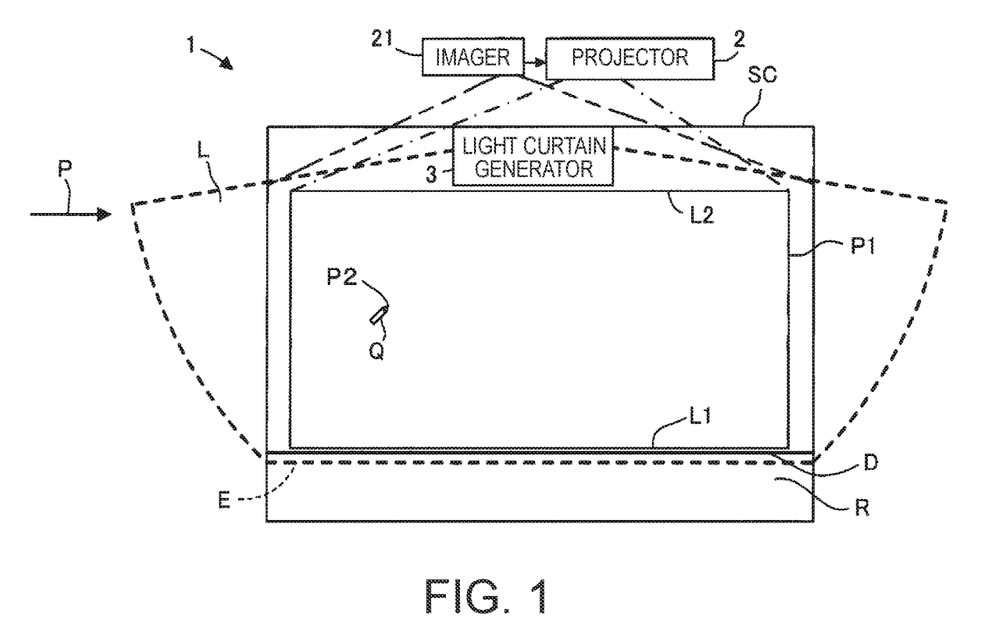
FIG. 1 diagrammatically shows an image display apparatus according to a first embodiment.
Figure 2:
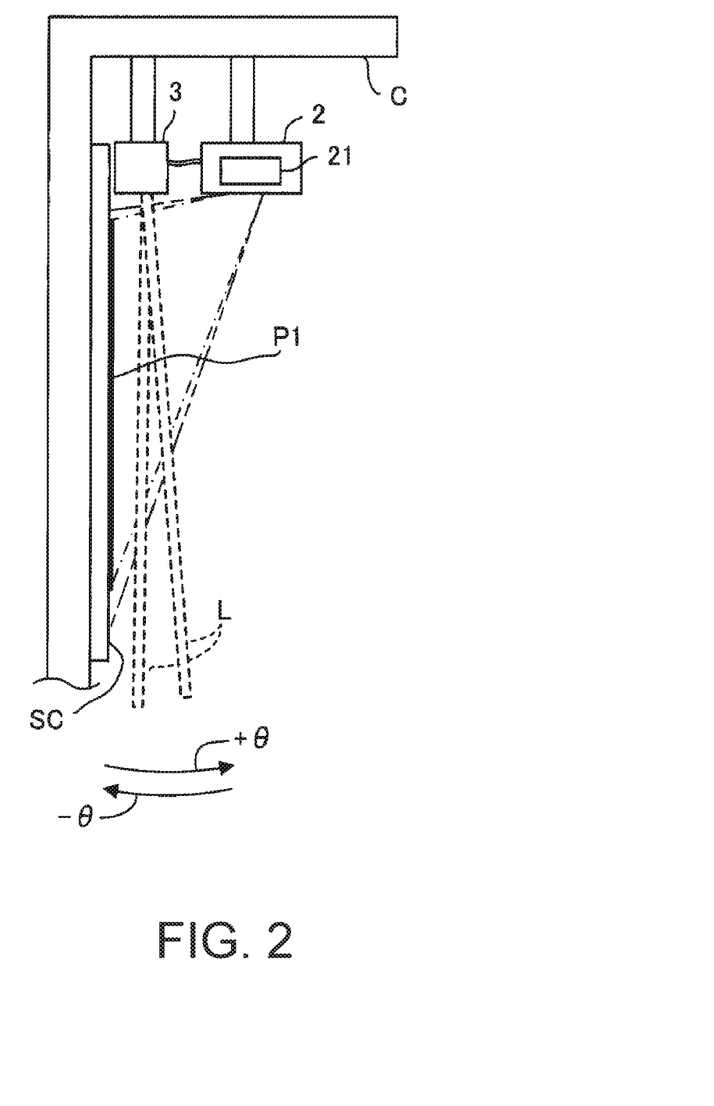
FIG. 2 is a side view of the image display apparatus viewed in the direction indicated by the arrow shown in FIG. 1.

FIG. 1 diagrammatically shows an image display apparatus 1 according to a first embodiment. FIG. 2 is a side view of the image display apparatus 1 viewed in the direction indicated by the arrow P shown in FIG. 1.

The image display apparatus 1 includes a projector 2, a light curtain generator 3, and an imager 21. In FIG. 2, the imager 21 is shown as hardware integrated with the projector 2. It is noted that the imager 21 may not be integrated with the projector 2 but may communicate with the projector 2 via a wire or wirelessly.

The projector 2 is installed on a ceiling C and projects and displays a projection image P1 on a screen SC. The screen SC is an example of a display surface. The projection image P1 is an example of an image.

The light curtain generator 3 is installed on the ceiling C, as the projector 2 is, and outputs planar light L (hereinafter referred to as "light curtain") that belongs to an infrared wavelength band. The light curtain L is used to detect a pointed position P2 located on the projection image P1 and pointed by a user with a pointing element Q. The pointing element Q is, for example, the user's finger, a stick, or a pen. The light curtain L is not limited to planar light and may instead be light having another shape.

The light curtain generator 3 changes the direction in which the light curtain L is outputted over at least the range defined by ±θ directions shown in FIG. 2 under the control of the projector 2 to adjust the angle of the light curtain L with respect to the screen SC.

The imager 21 is, for example, a camera including a CCD (charge coupled device) or a CMOS (complementary metal oxide semiconductor) device, each of which is an imaging device that converts light collected with an optical system, such as a lens, into an electric signal. The imager 21 is located in a position where the imager 21 can capture an image of reflected light curtain L. An infrared filter for receiving the reflected light curtain L is attached to the imager 21.

The imager 21 captures the projection image P1 on the screen SC to produce a captured image and outputs the captured image to the projector 2. The captured image shows the light curtain L reflected off the pointing element Q or the light curtain L reflected off the screen SC during the adjustment of the angle of the light curtain L with respect to the screen SC.

The projector 2 uses the captured image to detect the position where the light curtain L is reflected. The projector 2 has a normal use mode and a mode in which the angle of the light curtain L is adjusted.

In the normal use mode, the projector 2 displays a cursor or any other object in the position where the light curtain L is reflected off the pointing element Q (pointed position P2).

In the mode in which the angle of the light curtain L is adjusted, the projector 2 controls the light curtain generator 3 based on the position where the light curtain L is reflected off the screen SC to adjust the angle of the light curtain L with respect to the screen SC. The position where the light curtain L is reflected off the screen SC is also simply referred to as a "reflected position E."

Figure 3:
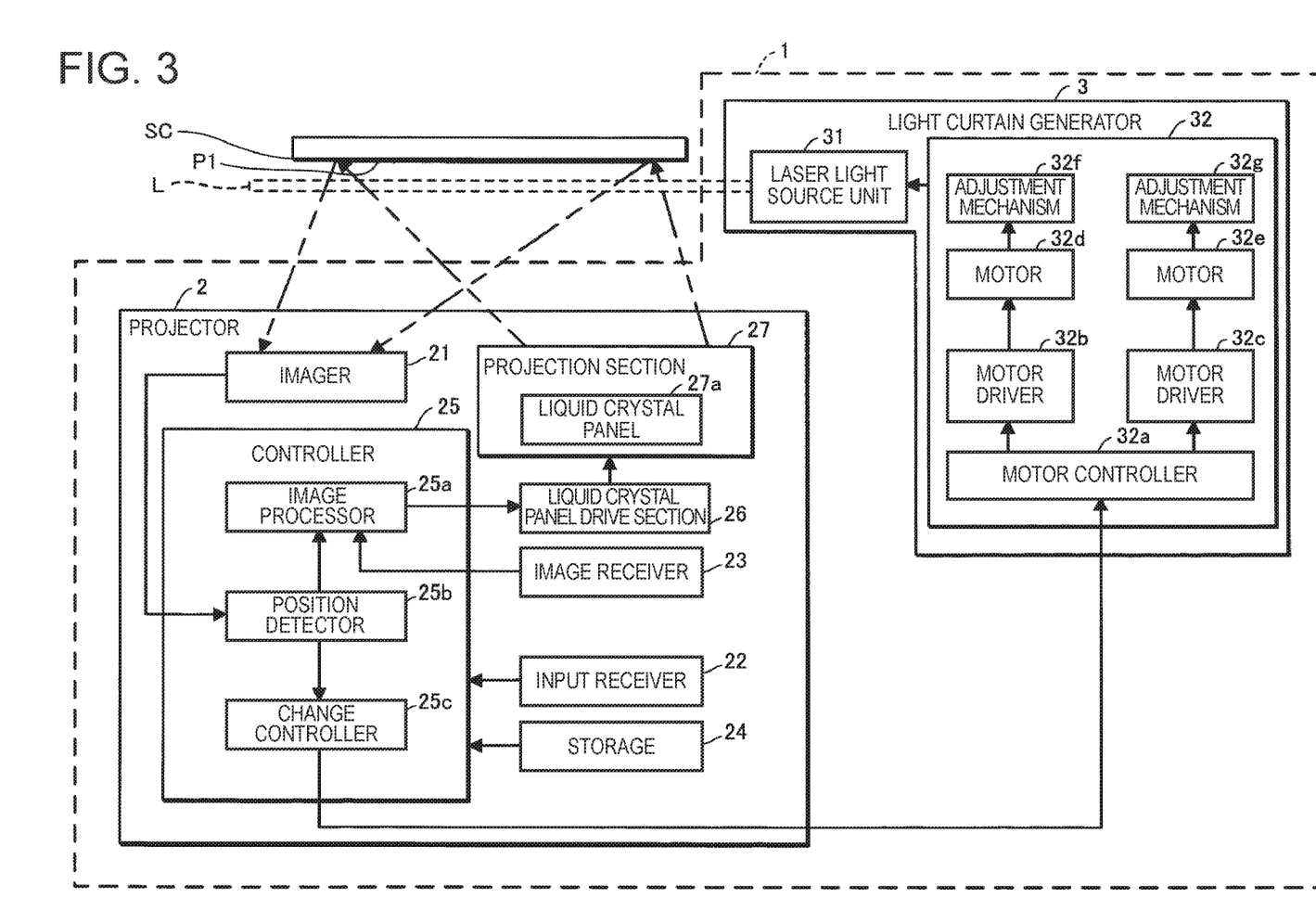
FIG. 3 shows a projector and a light curtain generator.

FIG. 3 shows the projector 2 and the light curtain generator 3.

The projector 2 includes an input receiver 22, an image receiver 23, a storage 24, a controller 25, a liquid crystal panel drive section 26, and a projection section 27 in addition to the imager 21. The light curtain generator 3 includes a laser light source unit 31, which outputs the light curtain L, and a changer 32, which changes the angle of the light curtain L with respect to the screen SC.

The input receiver 22 is formed, for example, of a variety of operation buttons or operation keys or a touch panel for receiving an input or any other action from the user. The input receiver 22 may instead, for example, be a remote control that transmits information representing an input received from the user wirelessly or via a wire. In this case, the projector 2 includes a receiver that receives the information transmitted by the remote control. The remote control includes a variety of operation buttons or operation keys, a touch panel, or any other component for receiving an input from the user.

The image receiver 23 receives an image signal representing an image via an image input terminal or any other component and outputs the image signal to the controller 25.

The storage 24 is a computer readable recording medium and is formed, for example, of a RAM (random access memory) and a ROM (read only memory). The storage 24 may further include an HDD (hard disk drive), an SSD (solid state drive), and other components. The storage 24 stores, for example, a variety of pieces of information and programs processed by the projector 2.

The controller 25 is a computer, such as a CPU (central processing unit). The controller 25 reads and executes the programs stored in the storage 24 to achieve an image processor 25a, which processes the image signal, a position detector 25b, which detects the position where the light curtain L is reflected, and a change controller 25c, which controls the light curtain generator 3. The entirety or part of the image processor 25a, the position detector 25b, and the change controller 25c may be formed of hardware, such as an FPGA (field programmable gate array) that is not shown.

The controller 25 switches the mode of the projector 2 between the normal use mode and the mode in which the angle of the light curtain L is adjusted in accordance with the user's input received via the input receiver 22.

The image processor 25a converts the image signal received via the image receiver 23 into image information representing the grayscales of each pixel of a liquid crystal panel 27a provided in the projection section 27 on an RGB (red, green, and blue) color basis.

The liquid crystal panel drive section 26 applies drive voltage according to the image information inputted from the image processor 25a to each pixel of the liquid crystal panel 27a provided in the projection section 27.

The projection section 27 is an example of a display section. The projection section 27 projects and displays the projection image P1 on the screen SC. The screen SC is not part of the display section. The projection section 27 includes a light source that is not shown and a reflector that is not shown but reflects light emitted from the light source toward the liquid crystal panel 27a. The liquid crystal panel 27a is an example of a light modulator. The pixels of the liquid crystal panel 27a modulate the light reflected off the reflector in accordance with the drive voltage applied from the liquid crystal panel drive section 26 to produce light representing an image according to the image information.

The projection section 27 then projects the image light produced by the liquid crystal panel 27a as the projection image P1 on the screen SC via a projection lens that is not shown. The light source is, for example, a discharge-type light source lamp formed of an ultrahigh-pressure mercury lamp, a metal halide lamp, or any other lamp, but the light source is not limited to a lamp and may instead be an LED (light emitting diode) light source, a laser light source, or any other solid-state light source.

The position detector 25b detects the position where the light curtain L is reflected based on the captured image containing the light curtain L reflected off the pointing element Q or the light curtain L reflected off the screen SC.

The change controller 25c controls the changer 32 based on the result of the detection performed by the position detector 25b to adjust the angle of the light curtain L with respect to the screen SC. In the present embodiment, the change controller 25c controls the changer 32 in such a way that the position E where the light curtain L is reflected off the screen SC coincides with a target position D (see FIG. 1).

The target position D is located in an area R on the side opposite the light curtain generator 3 with respect to the projection image P1 displayed on the screen SC. In the present embodiment, the target position D is a position in the area R and in the vicinity of the projection image P1 (position separate from projection image P1 by distance ranging from 1 to 10 mm, for example). The distance between the target position D and the projection image P1 does not necessarily range from 1 to 10 mm and can be changed as appropriate. In the following description, a portion that forms the projection image P1 and is in contact with the area R is referred to as a "lower end L1," and a portion that forms the projection image P1 and faces away from the lower end L1 is referred to as an "upper end L2."

The change controller 25c controls the changer 32 by using a control signal S, which controls the rotation produced by motors 32d and 32e (see FIG. 3) incorporated in the changer 32. The control signal S represents the number of revolutions at which the motor 32d runs and the direction of the revolutions and the number of revolutions at which the motor 32e runs and the direction of the revolutions.

The laser light source unit 31 is, for example, a unit in which a collimator lens, a Powell lens, and other optical system members are attached to one or more LDs (laser diodes) and outputs the light curtain L. The laser light source unit 31 is an example of an output section. The output section is not limited to the laser light source unit 31 and can be changed as appropriate. The output section may, for example, be an LED.

The changer 32 includes a motor controller 32a, motor drivers 32b and 32c, the motors 32d and 32e, and adjustment mechanisms 32f and 32g. The motors 32d and 32e are each a stepper motor.

The motor controller 32a controls the motor drivers 32b and 32c in accordance with the control signal S from the change controller 25c to run the motors 32d and 32e. The motors 32d and 32e are each an example of a drive section, and the rotation produced by the motors 32d and 32e is an example of a drive action of the drive section.

Figure 4:
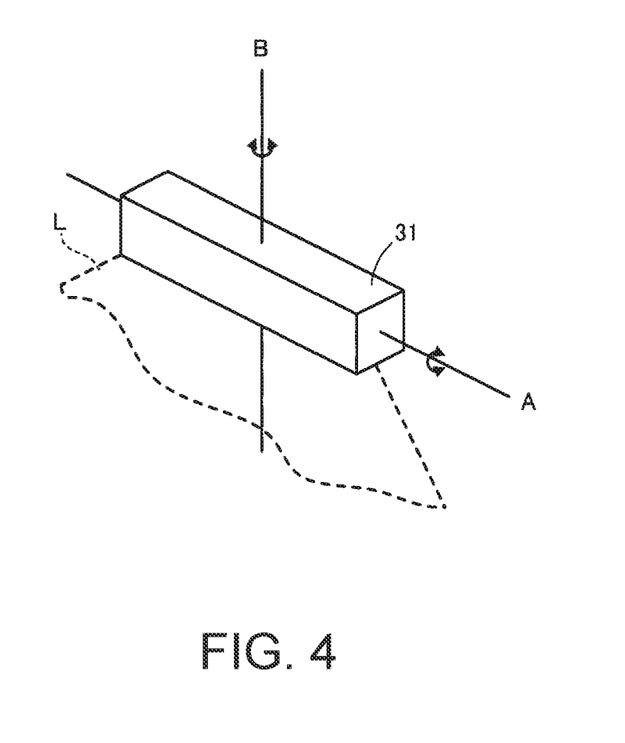
FIG. 4 shows the directions in which a laser light source unit is adjusted.

The adjustment mechanism 32f rotates the laser light source unit 31 around an axis of rotation A shown in FIG. 4 in accordance with the rotation produced by the motor 32d to change the angle of the light curtain L with respect to the screen SC. When the laser light source unit 31 rotates around the axis of rotation A, the orientation of the light curtain L is changed over the range defined by ±θ directions shown in FIG. 2. The +θ direction is the direction in which the light curtain L moves away from the screen SC, and the −θ direction is the direction in which the light curtain L approaches the screen SC.

The adjustment mechanism 32g rotates the laser light source unit 31 around an axis of rotation B shown in FIG. 4 in accordance with the rotation produced by the motor 32e to change the angle of the light curtain L with respect to the screen SC. The axis of rotation B is so set as to intersect the axis of rotation A, for example, so set as to be perpendicular thereto.

The action of the image display apparatus 1 will next be described.

Figure 5:
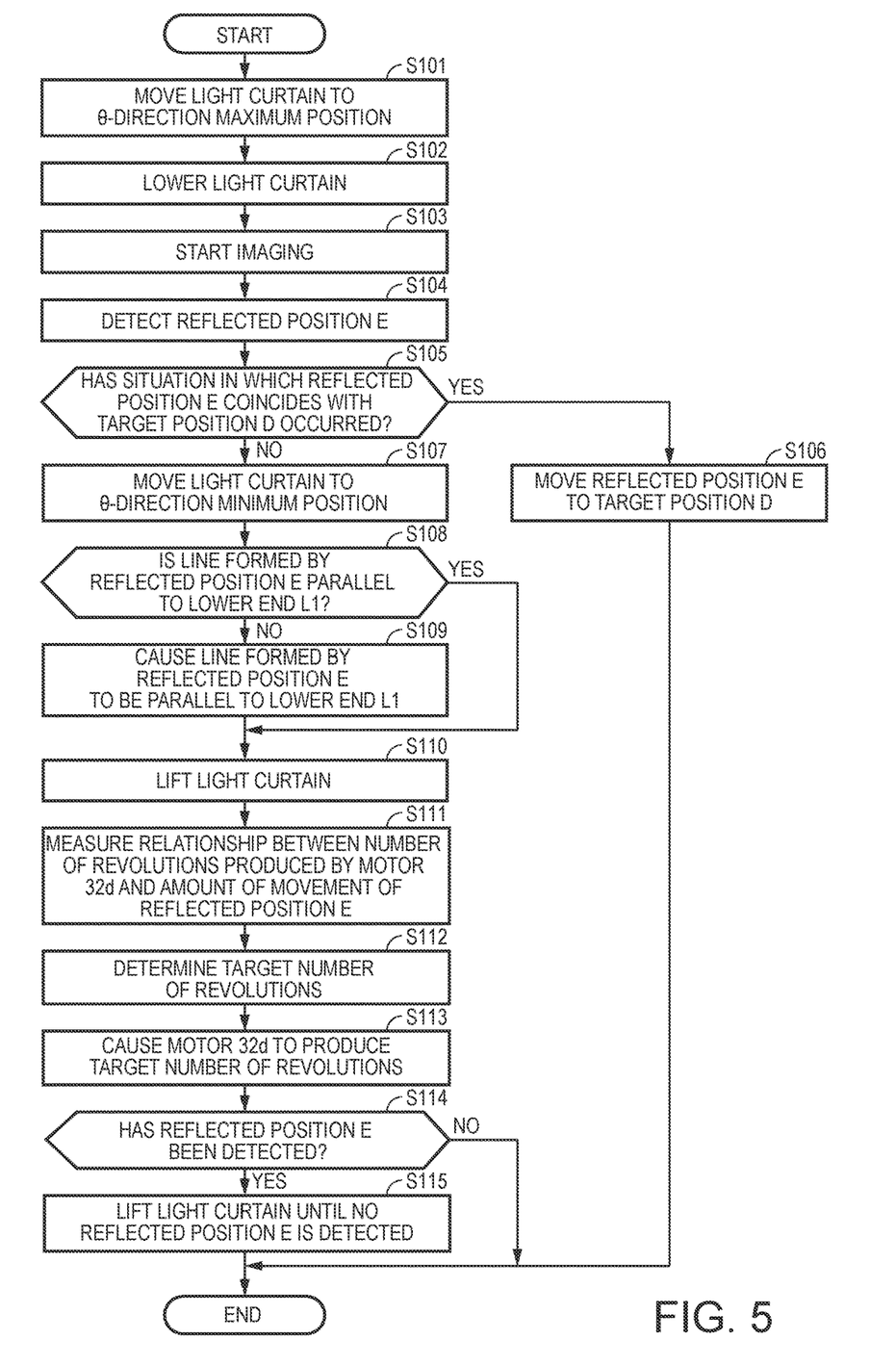
FIG. 5 is a flowchart for describing the action of the image display apparatus.

FIG. 5 is a flowchart for describing the action in the mode in which the angle of the light curtain L is adjusted. In the following description, the position of the light curtain L having moved to the limit in the +θ direction is referred to as a "θ-direction maximum position," and the position of the light curtain L having moved to the limit in the −θ direction is referred to as a "θ-direction minimum position." Further, moving the light curtain L in the +θ direction is also referred to as "lifting the light curtain L," and moving the light curtain L in the −θ direction is also referred to as "lowering the light curtain L."

Figure 6:
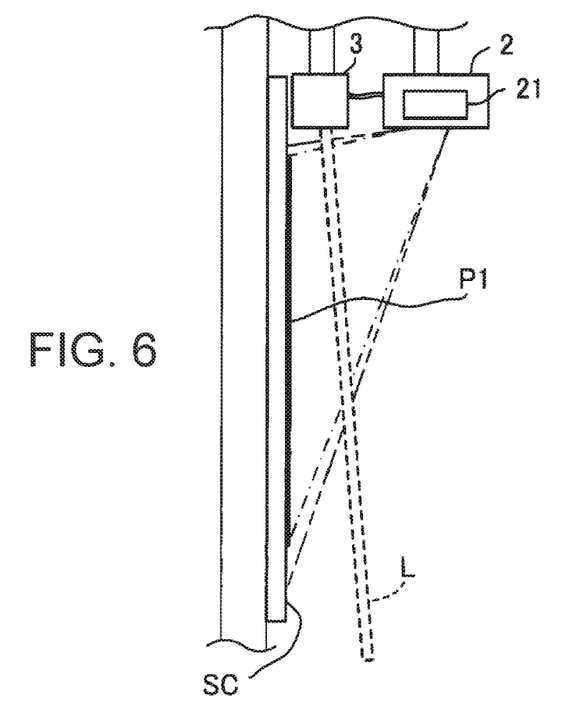
FIG. 6 shows a state in which a light curtain is located in a θ-direction maximum position.

When the projector 2 operates in the mode in which the angle of the light curtain L is adjusted, the change controller 25c first outputs to the motor controller 32a the control signal S that causes the motor 32d to move the light curtain L to the θ-direction maximum position. The motor controller 32a controls the motor driver 32b in accordance with the control signal S to move the light curtain L to the θ-direction maximum position (step S101). FIG. 6 shows the state in which the light curtain L is located in the θ-direction maximum position.

The change controller 25c subsequently outputs to the motor controller 32a the control signal S that causes the motor 32d to lower the light curtain L. The motor controller 32a starts lowering the light curtain L in accordance with the control signal S (step S102). The change controller 25c further starts causing the imager 21 to repeatedly capture images of the screen SC (step S103).

When the light curtain L is lowered and the screen SC is irradiated with the light curtain L, the light curtain L is reflected (irregularly reflected) off the screen SC. Part of the light curtain L reflected off the screen SC is therefore imaged by the imager 21.

In this process, the greater the distance between the position E, where the light curtain L is reflected, and the imager 21, the lower the intensity of the reflected light curtain L received by the imager 21. Further, the intensity of the reflected light curtain L changes in accordance with the reflection characteristic of the screen SC. Therefore, in a case where the reflected position E is located in the vicinity of the lower end L1 or in the area R, a situation in which the captured image shows no reflected light curtain L occurs.

Figure 7:
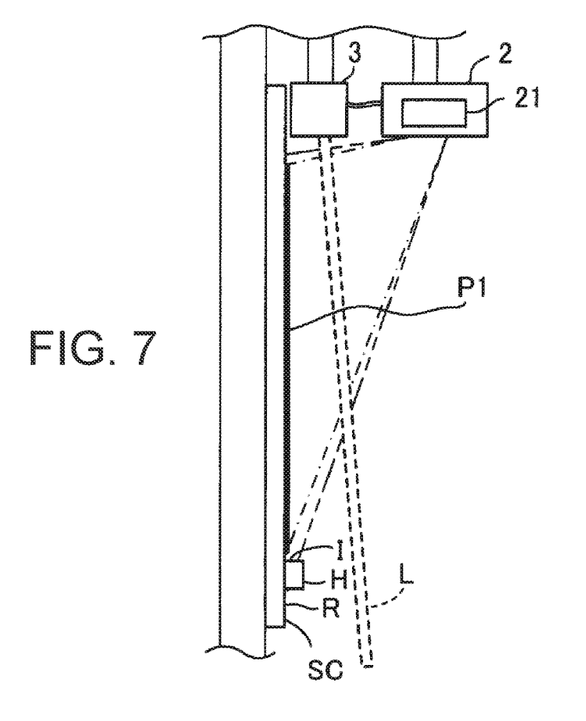
FIG. 7 shows an example of a screen having an area where a protrusion is provided.

Further, as shown in FIG. 7, in a case where a protrusion (frame, for example) H is provided in the area R, and in the situation in which the light curtain L has been lowered, the protrusion H is first irradiated with the light curtain L, and the screen SC is then irradiated with the light curtain L.

The angle of incidence of the light curtain L incident on a surface I that forms the protrusion H and faces the light curtain generator 3 differs from the angle of incidence of the light curtain L incident on the screen SC, and the possibility of the light curtain L reflected off the protrusion H (surface I) and entering the imager 21 is higher than the possibility of the light curtain L reflected off the screen SC and entering the imager 21. Therefore, in a certain situation, the imager 21 first produces a captured image showing the light reflected off the protrusion H, then produces a captured image showing no reflected light produced in the area R or in the vicinity of the lower end L1, and then produces a captured image showing the light reflected off the screen SC in an area shifted from the lower end L1 toward the upper end L2.

The position detector 25b keeps detecting the reflected position E based on the captured images repeatedly produced by the imager 21 during the period for which the light curtain L is lowered (step S104). The position detector 25b outputs the result of the detection of the reflected position E to the change controller 25c.

The change controller 25c evaluates based on the result of the detection of the reflected position E whether or not a situation in which the reflected position E coincides with the target position D during the period for which the light curtain L is lowered has occurred (hereinafter referred to as "coincidence situation") (step S105). It is noted that the change controller 25c grasps the target position D, the position of the projection image P1, and the position of the area R in advance.

For example, the projection section 27 projects an image of a pattern specified in advance (entirely white image, for example) on the screen SC in advance. The imager 21 captures an image of the pattern projected on the screen SC. The change controller 25c acquires the result of the imaging performed by the imager 21 via the position detector 25b. The change controller 25c analyzes the result of the imaging performed by the imager 21 to grasp the position of the projection image P1 corresponding to the white area. The change controller 25c subsequently grasps the position of the area R on the side opposite the light curtain generator 3 with respect to the projection image P1. The change controller 25c subsequently grasps as the target position D the position that is present in the area R and separate from the projection image P1 by a distance of 5 mm.

Instead, the input receiver 22 may receive inputs representing the target position D, the position of the projection image P1, and the position of the area R from the user in advance, and the change controller 25c may grasp the target position D, the position of the projection image P1, and the position of the area R in accordance with the inputs received by the input receiver 22.

In a case where the coincidence situation occurs (YES in step S105), the change controller 25c outputs to the motor controller 32a the control signal S that causes the motors 32d and 32e to move the reflected position E to the target position D. The motor controller 32a controls the motor drivers 32b and 32c in accordance with the control signal S to move the reflected position E to the target position D (step S106).

The change controller 25c may carry out step S106 by causing the motors 32d and 32e to stop running when the coincidence situation occurs during the period for which the light curtain L is lowered.

Figure 8:
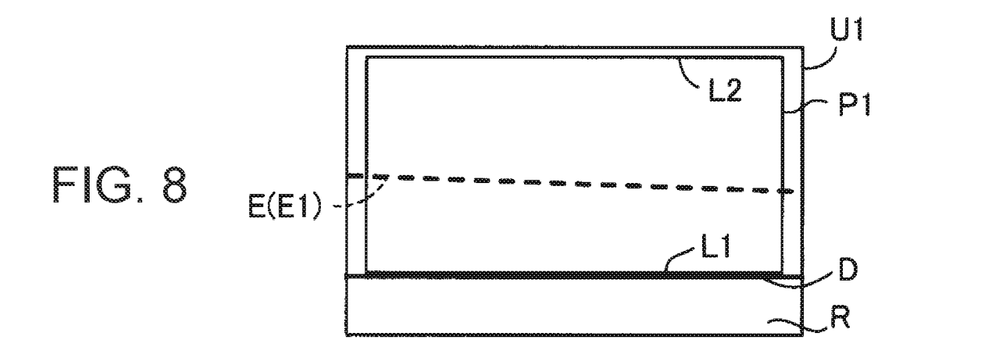
FIG. 8 shows a captured image in a case where a first position is present in a projection image.

On the other hand, in a case where the reflected position E detected for the first time after the light curtain L starts lowering (hereinafter referred to as "first position E1") is present in the projection image P1, as shown, for example, in FIG. 8, the change controller 25c determines that no coincidence situation has occurred (NO in step S105). FIG. 8 shows an example of a captured image U1 in the case where the first position E1 is present in the projection image P1.

Figure 9:
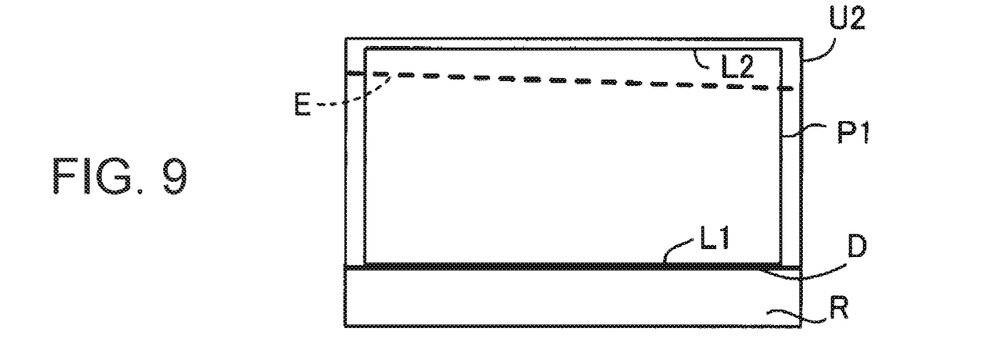
FIG. 9 shows a captured image in a case where the light curtain is located in a θ-direction minimum position.

In a case where the coincidence situation has not occurred, the change controller 25c outputs to the motor controller 32a the control signal S that causes the motor 32d to move the light curtain L to the θ-direction minimum position. The motor controller 32a controls the motor driver 32b in accordance with the control signal S to move the light curtain L to the θ-direction minimum position (step S107). FIG. 9 shows an example of a captured image U2 in the case where the light curtain L is located in the θ-direction minimum position.

Figure 10:
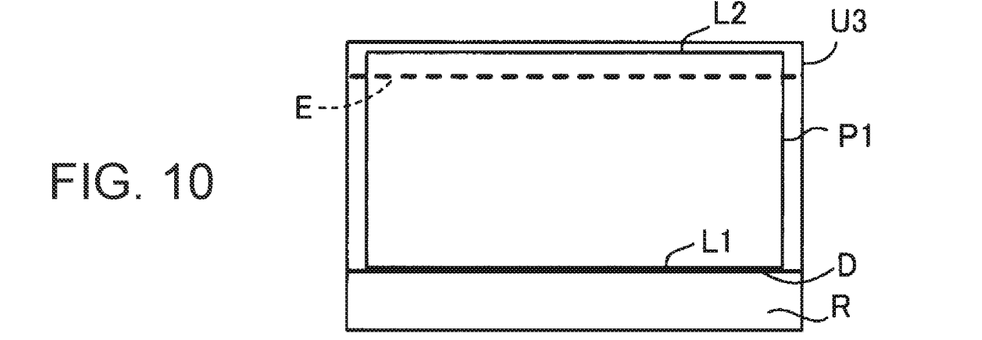
FIG. 10 shows a captured image in a case where the line formed by a reflected position is caused to be parallel to a lower end.

Subsequently, in a case where the line formed by the reflected position E is not parallel to the lower end L1 (NO in step S108), as shown, for example, in FIG. 9, the change controller 25c outputs to the motor controller 32a the control signal S that runs the motor 32e in such a way that the line formed by the reflected position E becomes parallel to the lower end L1. The motor controller 32a controls the motor driver 32c in accordance with the control signal S to cause the line formed by the reflected position E to be parallel to the lower end L1 (step S109). FIG. 10 shows an example of a captured image U3 in the case where the line formed by the reflected position E is caused to be parallel to the lower end L1. In a case where the line formed by the reflected position E is parallel to the lower end L1 at the end of step S107 (YES in step S108), step S109 is skipped.

The change controller 25c subsequently outputs to the motor controller 32a the control signal S that causes the motor 32d to lift the light curtain L. The motor controller 32a controls the motor driver 32b in accordance with the control signal S to lift the light curtain L (step S110). The control signal S used in this process is a control signal that lifts the light curtain L in such a way that the resultant amount of movement M of the reflected position E is smaller than the amount of movement to the reflected position E shown in FIG. 8 (first position E1). The reflected position E moved in accordance with the control signal S is therefore shown in a captured image.

The change controller 25c subsequently measures the relationship between the number of revolutions G produced by the motor 32d in step S110 and the amount of movement M of the reflected position E resulting from the number of revolutions G (step S111). For example, the change controller 25c identifies the number of revolutions G from the control signal S used in step S110 and identifies the amount of movement M from the results of the detection performed by the position detector 25b before and after step S111.

As an example of the relationship between the number of revolutions G and the amount of movement M, for example, in a case where when the motor 32d produces 32 revolutions, the amount of movement M of the reflected position E is half the distance from the upper end L2 to the lower end L1, the number of revolutions G is "32 revolutions" and the amount of movement M is "half the distance from the upper end L2 to the lower end L1." The relationship between the number of revolutions G and the amount of movement M is not limited to the relationship described above. Further, the number of revolutions is not limited to an integer and may, for example, be a fraction or may be expressed by the number of steps by which the motor 32d runs. The number of revolutions produced by the motor 32d is an example of the amount of drive action of the drive section.

The change controller 25c subsequently determines, based on the relationship between the number of revolutions G and the amount of movement M, a target number of revolutions T, which allows the reflected position E to be moved to the target position D (step S112). The target number of revolutions T is an example of a target amount of drive action.

Let now a distance F be the distance from the current reflected position E to the target position D, and the change controller 25c determines the target number of revolutions T, for example, by using the following arithmetic equation: Target number of revolutions T=(distance F×number of revolutions G)/(amount of movement M).

The change controller 25c may calculate the target number of revolutions by using an arithmetic equation different from the arithmetic equation described above. For example, the change controller 25c may calculate the target number of revolutions T by using the following arithmetic equation: Target number of revolutions T=coefficient J×(distance F×number of revolutions G)/(amount of movement M). The coefficient J is a constant greater than 1.

Figure 11:
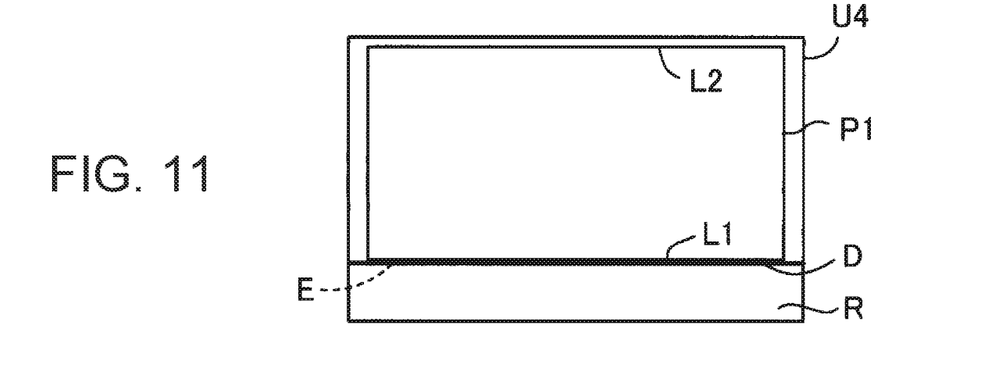
FIG. 11 shows a captured image in a case where the reflected position is located in a target position.

The change controller 25c subsequently outputs to the motor controller 32a the control signal S that causes the motor 32d to produce the target number of revolutions T. The motor controller 32a controls the motor driver 32b in accordance with the control signal S to cause the motor 32d to produce the target number of revolutions T (step S113). The reflected position E therefore moves to the target position D. FIG. 11 shows a captured image U4 in the case where the reflected position E is located in the target position D.

In a case where the protrusion H (see FIG. 7) is provided in the vicinity of the target position D, the position detector 25b is undesirably likely to detect the reflected position E even though no pointing element Q is present.

To avoid the situation described above, in the case where the position detector 25b has detected the reflected position E when step S113 is completed (YES in step S114), the change controller 25c outputs to the motor controller 32a the control signal S that causes the motor 32d to lift the light curtain L until no reflected position E is detected. The motor controller 32a controls the motor driver 32b in accordance with the control signal S to lift the light curtain L until no reflected position E is detected (step S115). In a case where the position detector 25b has detected no reflected position E when step S113 is completed, step S115 is skipped.

According to the present embodiment, the angle of the light curtain L with respect to the screen SC is changed based on the reflected position E, where the light curtain L is reflected. Therefore, as compared with the case where the user places the jig on the screen SC and manually adjusts the orientation of the light curtain L, the cumbersomeness of the adjustment task can therefore be reduced.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

In a case where the position detector 25b does not detect the target position D as the reflected position E (coincidence situation does not occur) even after the position detector 25b controls the changer 32, the change controller 25c may control the laser light source unit 31 to increase the amount of light curtain L to a value greater than the amount of light curtain L in the case described above. For example, in the case where the coincidence situation has not occurred (NO in step S105), the change controller 25c increases the amount of light curtain L to a value greater than the amount of light curtain L in the case described above and returns to the process in step S101.

According to Variation 1, for example, in a case where low-intensity reflected light does not allow the position detector 25b to detect the target position D as the reflected position E, the amount of light curtain L can be increased to a value greater than the amount of light curtain L in the case described above. The reflected light can therefore be more intense, whereby the reflected position E is more readily detected.

Variation 2

In the case where the position detector 25b does not detect the target position D as the reflected position E even after the position detector 25b controls the changer 32, the sensitivity of the imager 21 may be increased to a value higher than the sensitivity in the case described above. For example, in the case where the coincidence situation has not occurred (NO in step S105), the change controller 25c increases the sensitivity of the imager 21 to a value higher than the sensitivity in the case described above by prolonging the exposure period (light reception period) for which the imager 21 performs imaging to a value longer than the exposure period in the case described above. The change controller 25c then returns to the process in step S101.

According to Variation 2, for example, in a case where low-intensity reflected light does not allow the position detector 25b to detect the target position D as the reflected position E, the sensitivity of the imager 21 can be increased. The reflected position is therefore more readily shown in a captured image, whereby the reflected position E is more readily detected.

Variation 3

Step S109 may be carried out after step S113 is completed.

Variation 4

Figure 12:
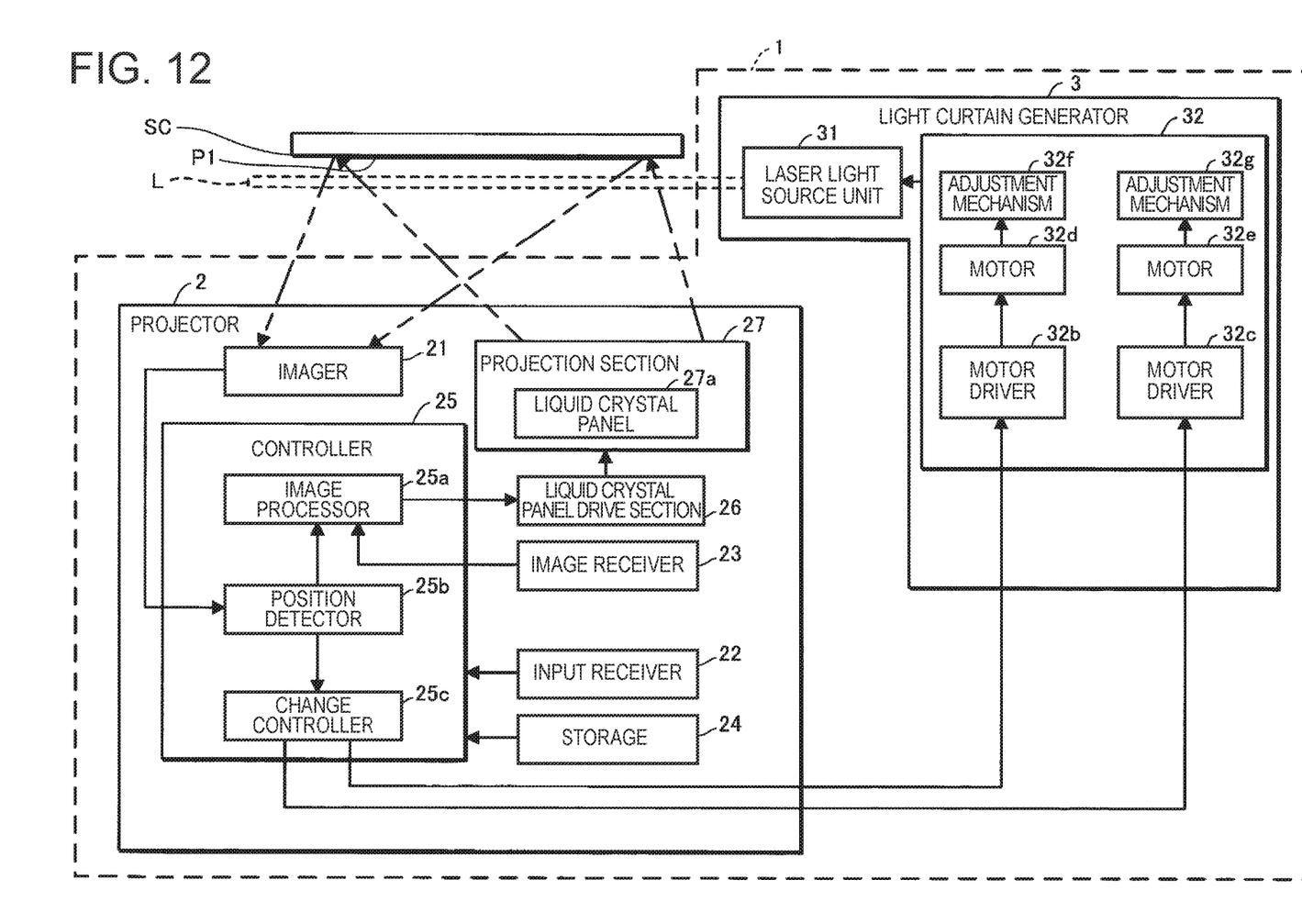
FIG. 12 diagrammatically shows a variation.

The change controller 25c may directly control the motor drivers 32b and 32c, as shown in FIG. 12.

Variation 5

The projector 2, the light curtain generator 3, and the imager 21 may be so configured that two or more thereof are integrated with each other into one-piece hardware.

Variation 6

The display surface is not limited to the screen SC and can be changed as appropriate. For example, the display surface may, for example, be a flat surface of an object, such as a wall or the upper surface of a table.

Variation 7

The projector 2 is not necessarily installed on the ceiling C and may be installed, for example, on a table or a wall. Further, the light curtain generator 3 is not necessarily installed in a position above the screen SC and may be installed, for example, in a position below the screen SC or at the right or left end of the screen SC.

Variation 8

The wavelength band to which the light curtain L belongs may instead, for example, be a visible wavelength band.

Variation 9

The drive section is not limited to a motor and can be any of a variety of other actuators.

Variation 10

The liquid crystal panel 27a used as the light modulator is formed, for example, of three transmissive or reflective liquid crystal panels. The light modulator may instead, for example, be based on one liquid crystal panel combined with a color wheel, three digital mirror devices (DMDs), or one digital mirror device combined with a color wheel. Further, a configuration including no liquid crystal panel or DMD but capable of modulating light emitted from a light source can be employed as the light modulator.

Variation 11

A projector is used as a display apparatus, but the display apparatus is not limited to a projector and can be changed as appropriate. For example, the display apparatus may be a direct-view display (such as liquid crystal display, organic EL (electro luminescence) display, plasma display, and CRT (cathode ray tube) display).

Variation 12

In the embodiment described above, the change controller 25c moves the light curtain L to the θ-direction maximum position (step S101) and then moves the light curtain L downward (step S102), the position detector 25b keeps detecting the reflected position E based on captured images repeatedly produced by the imager 21 (step S104), and the change controller 25c evaluates whether or not the situation in which the reflected position E coincides with the target position D during the period for which the light curtain L is lowered has occurred (step S105). Instead, after the light curtain L may be moved to the θ-direction minimum position in step S101, the light curtain L may be moved upward in step S102, the position detector 25b may keep detecting the reflected position E in step S104, and whether or not the situation in which the reflected position E coincides with the target position D has occurred may be evaluated in step S105.

The entire disclosures of Japanese patent application nos. JP 2017-058430 filed on Mar. 24, 2017 and JP 2018-002336 filed on Jan. 11, 2018 are expressly incorporated by reference herein.

What is claimed is:

1. An image display apparatus comprising:
    a display section that displays an image on a display surface;
    an output section that outputs light;
    a changer that changes an angle of the light outputted from the output section with respect to the display surface, wherein the changer includes a drive section and an adjustment mechanism that changes the angle in accordance with a drive action of the drive section;
    a position detector that detects a reflected position where the light outputted by the output section is reflected directly on the display surface, and outputs a result of the detection of the reflected position; and
    a change controller that controls the changer based on the result of the detection of the reflected position outputted by the position detector, wherein the change controller controls the drive action of the drive section based on the reflected position detected by the position detector and a target position on a side opposite the output section with respect to the image on the display surface, wherein
    the change controller evaluates, based on the result of the detection of the reflected position, whether or not the reflected position coincides with the target position, and
    when the position detector does not detect, as the reflected position, the target position, the change controller determines, based on a relationship between an amount of the drive action of the drive section and an amount of movement of the reflected position, a target drive amount that allows the reflected position to move to the target position, and the change controller drives the drive section by the target drive amount.

2. The image display apparatus according to claim 1, wherein
    in the case where the position detector does not detect the target position as the reflected position even after the change controller controls the drive action of the drive section, the change controller measures the relationship based on the result of the detection performed by the position detector when the drive section is driven and determines the target drive amount based on the measured relationship.

3. The image display apparatus according to claim 1, wherein
in a case where the position detector detects the reflected position when the drive section is driven by the target drive amount, the change controller controls the drive action of the drive section until the position detector does not detect the reflected position.

4. The image display apparatus according to claim 1, wherein
in a case where the position detector does not detect, as the reflected position, the target position even after the change controller controls the changer, the change controller increases an amount of the light outputted from the output section to a value greater than an amount of the light in the case.

5. The image display apparatus according to claim 1, further comprising
an imager that captures an image of the display surface to produce a captured image, wherein
the position detector detects the reflected position based on the captured image, and
in a case where the position detector does not detect, as the reflected position, the target position even after the change controller controls the changer, the change controller increases sensitivity of the imager to a value higher than the sensitivity in the case.

6. A method for controlling an image display apparatus including a display section that displays an image on a display surface, an output section that outputs light, and a changer that changes an angle of the light outputted from the output section with respect to the display surface, the method comprising:
outputting light;
detecting a reflected position where the light outputted is reflected directly on the display surface, and outputting a result of the detection of the reflected position;
controlling the changer based on the outputted result of the detection of the reflected position, wherein the changer includes a drive section and an adjustment mechanism that changes the angle in accordance with a drive action of the drive section;
controlling the drive action of the drive section based on the reflected position and a target position on a side opposite the output section with respect to the image on the display surface;
evaluating, based on the result of the detection of the reflected position, whether or not the reflected position coincides with the target position; and
when the target position is not detected as the reflected position, determining, based on a relationship between an amount of the drive action of the drive section and an amount of movement of the reflected position, a target drive amount that allows the reflected position to move to the target position, and driving the drive section by the target drive amount.

7. An image display apparatus comprising:
a display section that displays an image on a display surface;
an output section that outputs light;
a changer that changes an angle of the light outputted from the output section with respect to the display surface, wherein the changer includes a drive section and an adjustment mechanism that changes the angle in accordance with a drive action of the drive section;
a position detector that detects a reflected position where the light outputted by the output section is reflected directly on the display surface; and
a change controller that controls the changer based on a result of the detection performed by the position detector, wherein the change controller controls the drive action of the drive section based on the reflected position detected by the position detector and a target position on a side opposite the output section with respect to the image on the display surface, wherein
the adjustment mechanism includes a first adjustment mechanism that rotates the output section around a first axis of rotation and a second adjustment mechanism that rotates the output section around a second axis of rotation that intersects the first axis of rotation.

* * * * *